April 2, 1935. K. SUNDBERG ET AL 1,996,530
METHOD OF AND APPARATUS FOR ELECTRICAL INVESTIGATION OF ROCK DRILL HOLES
Filed Aug. 31, 1934
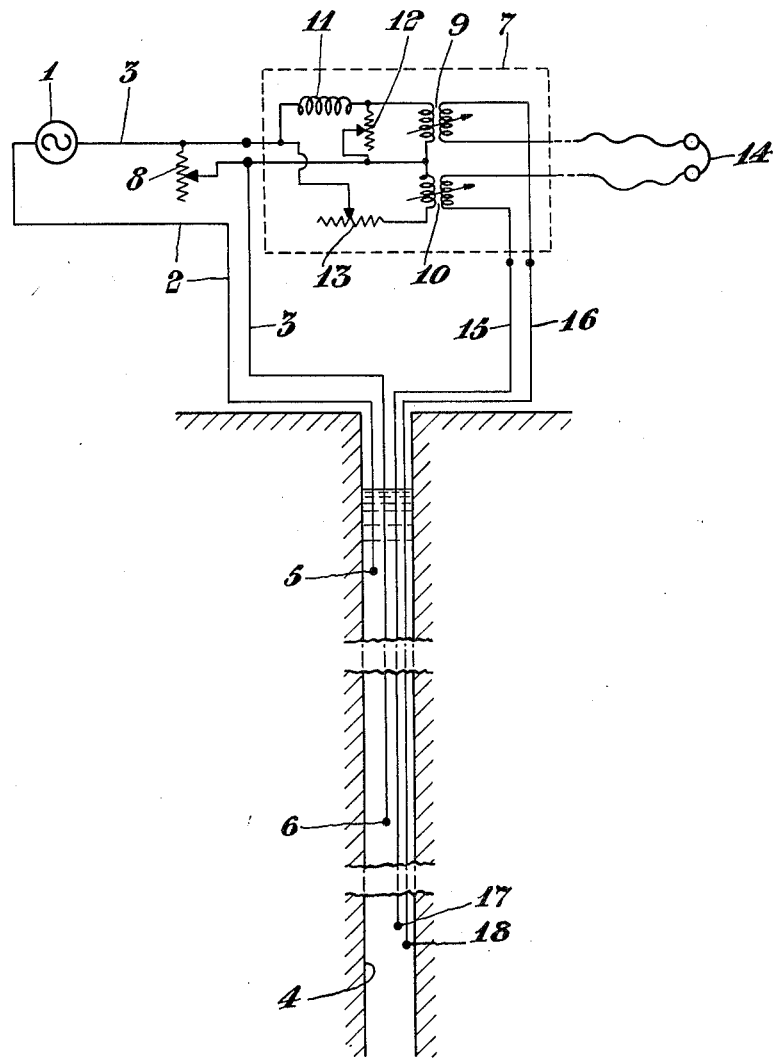
Inventors:
Karl Sundberg
Erik Helmer Lars Hedström
by George Bayard Jones
Attorney.

Patented Apr. 2, 1935

1,996,530

UNITED STATES PATENT OFFICE 1,996,530

METHOD OF AND APPARATUS FOR ELECTRICAL INVESTIGATION OF ROCK DRILL HOLES

Karl Sundberg and Erik Helmer Lars Hedström, Stockholm, Sweden, assignors to Aktiebolaget Elektrisk Malmletning, Stockholm, Sweden, a company of Sweden Application August 31, 1934, Serial No. 742,268
In Sweden September 16, 1933

7 Claims. (Cl. 175—182)

The present invention relates to a method of electrical investigation of rock drill holes which renders it possible to identify and locate different kinds of rock, oil-containing strata, ores, and the like in such holes without resorting to the time-wasting and expensive method hitherto used of collecting so-called cores at intervals during the progress of the drilling operation. The invention also relates to an apparatus for carrying out the present method.

According to heretofore practised methods of investigating drill holes electrically, resistance measurements only have been made, either by measuring the ohmic resistance between two electrodes suspended in the same drill hole or in different drill holes, or by measuring the specific electric resistance of the ground at different points of the drill hole in the immediate vicinity of a direct current carrying electrode suspended in the drill hole by measuring the potential drop between two other electrodes located at determined distances from and in the immediate vicinity of the current carrying electrode. Such resistance measurements, however, do not always give reliable results, as, for instance, when it is desired to localize and identify oil-carrying strata penetrated by the hole, because such strata cannot be distinguished from other kinds of rock having a large ohmic resistance, such as very compact or gas-carrying strata.

In contrast to these previously practised methods the present invention is based on the observation, which has been made while performing electrical measurements on the surface of the ground, that in an electric alternating field produced in the ground, phase displacements are caused by certain kinds of rock, ores, and the like, constitute a measurable and characteristic quantity which renders it possible to distinguish various kinds of rock, ores, and the like from each other and to locate the boundaries between the same. Since said phase displacements depend, in part at least, on the dielectric constant of the various kinds of rock, ores, and the like which are traversed by the electric alternating field, the present invention provides a method of investigating rock drill holes which, in contrast to previously proposed methods, renders it possible to locate and identify various kinds of rock and ores met with in the drill hole by their different dielectric constants. This is of particularly great importance for instance when locating and identifying oil-carrying strata which is rendered possible by the large capacity resistance of such strata as compared to that of other strata.

In accordance herewith, the present method consists principally in filling the drill hole to be investigated with water or other liquid which is conductive to electric current, and in generating in the drill hole thus filled with liquid an electric alternating field which is then determined as regards phase and amplitude at different points of the drill hole.

Stated differently, the present invention is directed to a method of investigating a drill hole to identify and locate the value carrying strata and the non-value carrying strata adjacent said drill hole, the latter having present therein an electrically conductive liquid adjacent the strata to be identified and located, said liquid comprising generating an electric alternating field in said conductive liquid and determining the phase and amplitude of said field at different points of the drill hole.

The apparatus employed for carrying out the present method may suitably consist of two electrodes capable of being suspended at various depths in the liquid-filled drill hole, said electrodes being connected through insulated conductors with a suitable alternating current source, so that an electric alternating field may thus be generated in the drill hole, and of two further auxiliary pick-up electrodes adapted to be suspended in the same drill hole and which are connected through insulated conductors with an alternating current potentiometer by means of which the electric alternating field may be determined as regards phase and amplitude at different points of the drill hole. Broadly stated from an apparatus standpoint, the invention comprises means for generating an electric field in the conductive liquid present in the drill hole, and means for determining the phase and amplitude of said field at different points of the hole.

The accompanying drawing illustrates diagrammatically and by way of example an apparatus according to the present invention for the investigation of drill holes. Referring to the drawing, 1 denotes an alternating current generator, from which alternating current is conducted through two insulated conductors 2 and 3 to two electrodes 5 and 6 suspended at different depths in the water-filled drill hole 4. A portion of the current through the one conductor 3 is allowed to flow through an alternating current potentiometer 7, which is connected in parallel to an adjustable shunt resistance 8, so that any desired portion of the current in the conductor 3 may be caused to flow through the alternating current potentiometer 7, the potentiometer provides means for supplying the opposing voltage to balance the potential between the auxiliary pick-up electrodes hereinafter referred to. In the constructional form illustrated in the drawing said alternating current potentiometer 7 consists of two parallel circuits, each containing a variocoupler 9 and 10, respectively.

In one of said circuits an inductive resistance 11 is connected in series with the primary coil of the variocoupler 9, and a variable resistance 12 is connected in parallel with the same primary coil. In the other circuit a variable resistance 13 is connected in series with the primary coil of the variocoupler 10. By suitably selecting the inductive resistance 11 relatively to the self-induction of the primary coils of the two variocouplers, and by adjustment of the resistances 12 and 13, the current through the potentiometer may easily be equally divided in the two primary coils, and simultaneously, the current in the one primary coil may be given a phase displacement, for instance of 90°, relatively to the current in the other primary coil. The secondary coils of the two variocouplers 9 and 10 are in the present case connected in series with a telephone receiver 14, which serves as a zero indicator, and are connected through insulated conductors 15 and 16 with two further electrodes 17 and 18, which are also suspended in the drill hole 4. With the two secondary coils connected in this manner it is possible to obtain in the secondary circuit 14, 15, 17, 18, 16 an alternating potential of optional phase and amplitude, which is used for balancing the alternating potential between the two electrodes 17 and 18 which is set up by the alternating field generated in the drill hole by the main electrodes 5 and 6 in the manner above described, and it is thus possible to determine said alternating field as regards phase and amplitude.

For this purpose it is only required to adjust the variocouplers in such manner that no sound is heard in the telephone receiver 14, and guided by such adjustment one may determine the electric field at that point in the drill hole where the two auxiliary electrodes 17 and 18 are suspended, as regards phase as well as amplitude.

In practice the distance between the two auxiliary pick-up electrodes 17 and 18 should be chosen so small that the potential drop between said electrodes divided by the distance between the same may be deemed to be equal to the electric field in the space between said electrodes. The distance from the pair of electrodes 17, 18 to the nearest current carrying main electrode 6, on the other hand, should be at least 50 times the diameter of the drill hole, whereby the advantage is gained that the measuring results are not appreciably influenced by the electric conductivity of the liquid with which the drill hole is filled. The distance between the two current carrying main electrodes 5 and 6 should be still considerably larger than the lastmentioned distance. In certain cases it may be suitable to place the upper current carrying electrode 5 in a fixed position in the upper portion of the drill hole, while the other three electrodes 6, 17 and 18 are moved in unison to the various parts of the drill hole which are to be investigated.

The investigation is carried out by successively displacing the two pairs of electrodes 5, 6 and 17, 18, or alternatively, only the electrodes 6, 17, and 18, along the drill hole while simultaneously measuring phase and amplitude of the electric field at the pair of electrodes 17, 18. In this manner an electrical profile characteristic to the drill hole in question is obtained, which, upon comparison with electrical profiles of other drill holes in the same locality obtained in similar manner, admits of important conclusions being made as to the character and position of rocks, ores, oil-carrying strata, and the like met with in the drill hole.

The constructional form above described and illustrated in the drawing is only to be regarded as an example and may of course be modified in several ways as regards its details without departing from the principle of the invention.

We claim:

1. The method of electrically investigating rock drill holes for identifying and locating rocks, ores, oil-carrying strata, and the like in such holes, comprising filling the drill hole with an electrically conductive liquid, generating an electric alternating field in the liquid-filled hole, and determining the relative value of the said field as regards phase and amplitude at different points of the drill hole.

2. Apparatus for electrically investigating rock drill holes, comprising in combination two electrodes capable of being suspended at different depths in the drill hole, an alternating current source, insulated conductors connecting said electrodes to said alternating current source, two auxiliary electrodes adapted to be suspended at different depths in the drill hole, an alternating current potentiometer, insulated conductors connecting said auxiliary electrodes to said alternating current potentiometer, and means for indicating when the voltage between the auxiliary electrodes has been balanced by opposing voltage in the alternating current potentiometer.

3. In an apparatus for identifying and locating the value carrying strata and the non-value carrying strata adjacent a drill hole containing an electrically conductive liquid, the combination of means for generating an alternating electric field in said liquid, and means for determining the relative value of the phase and amplitude of said field at different points of said hole.

4. In an apparatus for identifying and locating the value carrying strata and the non-value carrying strata of a drill hole containing an electrically conductive liquid, the combination of means for generating an alternating electric field in said liquid, said means including a source of alternating current, electrodes suspended in said liquid and adapted to be moved to different points in said drill hole, and insulated conductors connecting said source of alternating current with said electrodes; and means for determining the relative value of the phase and amplitude of said field at different points of said drill hole.

5. In an apparatus for identifying and locating the value carrying strata and the non-value carrying strata of a drill hole containing an electrically conductive liquid, the combination of means for generating an alternating electric field in said liquid, said means including a source of alternating current, electrodes suspended in said liquid and adapted to be moved to different points in said drill hole, and insulated conductors connecting said source of alternating current with said electrodes; and means for determining the relative value of the phase and amplitude of said field at different points of said drill hole, said means including auxiliary pick-up electrodes suspended in said electrically conductive liquid and adapted to be moved to different depths in the drill hole, means for supplying opposing voltage to balance the potential between said auxiliary electrodes, insulated conductors connecting said voltage supplying means to said auxiliary electrodes, and means for indicating that the potential between said auxiliary electrodes is balanced.

6. In an apparatus for identifying and locating the value carrying strata and the non-value carrying strata of a drill hole containing an electrically conductive liquid, the combination of means for generating an alternating electric field in said liquid; and means for determining the relative value of the phase and amplitude of said field at different points of said hole, said means including auxiliary pick-up electrodes suspended in said electrically conductive liquid and adapted to be moved to different depths in the drill hole, means for supplying opposing voltage to balance the potential between said auxiliary electrodes, insulated conductors connecting said voltage supplying means to said auxiliary electrodes, and means for indicating that the potential between said auxiliary electrodes is balanced.

7. The method of investigating a drill hole to identify and locate the value carrying strata and non-value carrying strata adjacent said drill hole, the latter having present therein an electrically conductive liquid adjacent the strata to be identified and located, comprising generating an electric alternating field in said conductive liquid and determining the relative value of the phase and amplitude of said field at different points of said drill hole.

KARL SUNDBERG.
ERIK HELMER LARS HEDSTRÖM.